US008805929B2

(12) United States Patent
Erol et al.

(10) Patent No.: US 8,805,929 B2
(45) Date of Patent: Aug. 12, 2014

(54) EVENT-DRIVEN ANNOTATION TECHNIQUES

(75) Inventors: Berna Erol, San Jose, CA (US); Jonathan J. Hull, San Carlos, CA (US); Dar-Shyang Lee, Union City, CA (US)

(73) Assignee: Ricoh Company, Ltd., Tokyo (JP)

( * ) Notice: Subject to any disclaimer, the term of this patent is extended or adjusted under 35 U.S.C. 154(b) by 1036 days.

(21) Appl. No.: 11/158,315

(22) Filed: Jun. 20, 2005

(65) Prior Publication Data
US 2006/0288273 A1    Dec. 21, 2006

(51) Int. Cl.
*G06F 15/16*    (2006.01)
(52) U.S. Cl.
USPC .......................... 709/204; 709/227; 715/233
(58) Field of Classification Search
USPC .......... 709/219, 246, 204, 227; 715/206, 230, 715/231, 232, 233
See application file for complete search history.

(56) References Cited

U.S. PATENT DOCUMENTS

| | | |
|---|---|---|
| 4,578,718 A | 3/1986 | Parker et al. |
| 4,686,698 A | 8/1987 | Tompkins et al. |
| 4,787,063 A | 11/1988 | Muguet |
| 4,807,186 A | 2/1989 | Ohnishi et al. |
| 4,881,135 A | 11/1989 | Heilweil |
| 4,905,094 A | 2/1990 | Pocock et al. |
| 4,963,995 A | 10/1990 | Lang |
| 5,091,931 A | 2/1992 | Milewski |
| 5,164,839 A | 11/1992 | Lang |
| 5,206,929 A | 4/1993 | Langford et al. |
| 5,265,205 A | 11/1993 | Schroder |
| 5,321,396 A | 6/1994 | Lamming et al. |
| 5,363,425 A | 11/1994 | Mufti et al. |
| 5,436,792 A | 7/1995 | Leman et al. |
| 5,475,741 A | 12/1995 | Davis et al. |
| 5,485,611 A | 1/1996 | Astle |
| 5,491,511 A | 2/1996 | Odle |
| 5,502,774 A | 3/1996 | Bellegarda et al. |
| 5,526,037 A | 6/1996 | Cortjens et al. |
| 5,530,235 A | 6/1996 | Stefik et al. |
| 5,535,063 A | 7/1996 | Lamming |
| 5,537,141 A | 7/1996 | Harper et al. |
| 5,539,665 A | 7/1996 | Lamming et al. |
| 5,568,406 A | 10/1996 | Gerber |
| 5,596,581 A | 1/1997 | Saeijs et al. |

(Continued)

FOREIGN PATENT DOCUMENTS

| | | |
|---|---|---|
| JP | 403129990 | 6/1991 |
| JP | 07-234694 A | 9/1995 |

(Continued)

OTHER PUBLICATIONS

Notice of Allowance for U.S. Appl. No. 11/158,313, Mailed on Apr. 9, 2009, 14 pages.

(Continued)

*Primary Examiner* — David Lazaro
*Assistant Examiner* — Marie Georges Henry
(74) *Attorney, Agent, or Firm* — Kilpatrick Townsend & Stockton LLP (57) ABSTRACT

Techniques for annotating or bookmarking digital information. The digital information is annotated based upon events determined from the digital information. The digital information that is annotated may comprise one or more types of information including but not restricted to video information, audio information, images, documents, slides information, whiteboard information, notes information, and the like.

31 Claims, 6 Drawing Sheets

(56) References Cited

U.S. PATENT DOCUMENTS

| | | |
|---|---|---|
| 5,610,841 A | 3/1997 | Tanaka et al. |
| 5,633,723 A | 5/1997 | Sugiyama et al. |
| 5,635,982 A | 6/1997 | Zhang et al. |
| 5,673,016 A | 9/1997 | Lutes |
| 5,686,957 A | 11/1997 | Baker |
| 5,706,290 A | 1/1998 | Shaw et al. |
| 5,717,869 A | 2/1998 | Moran et al. |
| 5,717,879 A | 2/1998 | Moran et al. |
| 5,721,878 A | 2/1998 | Ottesen et al. |
| 5,729,741 A | 3/1998 | Liaguno et al. |
| 5,729,931 A | 3/1998 | Wade |
| 5,734,719 A | 3/1998 | Tsevdos et al. |
| 5,751,281 A | 5/1998 | Hoddie et al. |
| 5,760,767 A | 6/1998 | Shore et al. |
| 5,764,789 A | 6/1998 | Pare, Jr. et al. |
| 5,767,897 A | 6/1998 | Howell |
| 5,793,365 A | 8/1998 | Tang et al. |
| 5,799,150 A | 8/1998 | Hamilton et al. |
| 5,802,294 A | 9/1998 | Ludwig et al. |
| 5,845,261 A | 12/1998 | McAlbian et al. |
| 5,854,831 A | 12/1998 | Parsadayan et al. |
| 5,862,292 A | 1/1999 | Kubota et al. |
| 5,924,099 A | 7/1999 | Guzak et al. |
| 5,929,848 A | 7/1999 | Albukerk et al. |
| 5,946,654 A | 8/1999 | Newman et al. |
| 5,956,026 A | 9/1999 | Ratakonda |
| 5,978,477 A | 11/1999 | Hull et al. |
| 5,986,655 A | 11/1999 | Chiu et al. |
| 5,987,454 A | 11/1999 | Hobbs |
| 5,990,934 A | 11/1999 | Nalwa |
| 5,991,429 A | 11/1999 | Coffin et al. |
| 5,999,173 A | 12/1999 | Ubillos |
| 6,008,807 A | 12/1999 | Bretschneider et al. |
| 6,020,883 A | 2/2000 | Herz et al. |
| 6,041,360 A * | 3/2000 | Himmel et al. ............... 709/245 |
| 6,055,566 A * | 4/2000 | Kikinis ........................ 709/219 |
| 6,084,582 A | 7/2000 | Qureshi et al. |
| 6,115,718 A | 9/2000 | Huberman et al. |
| 6,154,601 A | 11/2000 | Yaegashi et al. |
| 6,154,771 A | 11/2000 | Rangan et al. |
| 6,177,939 B1 | 1/2001 | Blish et al. |
| 6,189,783 B1 | 2/2001 | Motomiya et al. |
| 6,193,658 B1 | 2/2001 | Wendelken et al. |
| 6,209,000 B1 | 3/2001 | Klein et al. |
| 6,249,281 B1 | 6/2001 | Chen et al. |
| 6,332,147 B1 | 12/2001 | Moran et al. |
| 6,334,109 B1 | 12/2001 | Kanevsky |
| 6,349,297 B1 | 2/2002 | Shaw et al. |
| 6,369,835 B1 | 4/2002 | Lin |
| 6,392,694 B1 | 5/2002 | Bianchi |
| 6,393,462 B1 * | 5/2002 | Mullen-Schultz ............ 709/206 |
| 6,396,500 B1 | 5/2002 | Qureshi et al. |
| 6,405,203 B1 | 6/2002 | Collart |
| 6,418,421 B1 | 7/2002 | Hurtado et al. |
| 6,421,009 B2 | 7/2002 | Suprunov |
| 6,449,653 B2 | 9/2002 | Klemets et al. |
| 6,452,615 B1 | 9/2002 | Chiu et al. |
| 6,469,711 B2 | 10/2002 | Foreman et al. |
| 6,490,601 B1 | 12/2002 | Markus et al. |
| 6,510,553 B1 | 1/2003 | Hazra |
| 6,526,426 B1 | 2/2003 | Lakritz |
| 6,529,920 B1 | 3/2003 | Arons et al. |
| 6,535,639 B1 | 3/2003 | Uchihachi et al. |
| 6,571,295 B1 * | 5/2003 | Sidana .......................... 709/246 |
| 6,646,655 B1 | 11/2003 | Brandt et al. |
| 6,665,490 B2 | 12/2003 | Copperman et al. |
| 6,721,288 B1 | 4/2004 | King et al. |
| 6,721,488 B1 | 4/2004 | Dimitrova et al. |
| 6,728,753 B1 | 4/2004 | Parasnis et al. |
| 6,750,978 B1 | 6/2004 | Marggraff et al. |
| 6,766,363 B1 * | 7/2004 | Rothschild ................... 709/219 |
| 6,779,024 B2 | 8/2004 | DeLaHuerga |
| 6,782,049 B1 | 8/2004 | Dufaux et al. |
| 6,789,228 B1 | 9/2004 | Merrill et al. |
| 6,810,146 B2 * | 10/2004 | Loui et al. .................... 382/173 |
| 6,816,858 B1 | 11/2004 | Coden et al. |
| 6,976,032 B1 | 12/2005 | Hull et al. |
| 7,020,721 B1 * | 3/2006 | Levenberg ................... 709/246 |
| 7,131,058 B1 | 10/2006 | Lapstun et al. |
| 7,167,191 B2 | 1/2007 | Hull et al. |
| 7,174,289 B2 | 2/2007 | Sukehiro |
| 7,184,100 B1 | 2/2007 | Wilf et al. |
| 7,215,436 B2 | 5/2007 | Hull et al. |
| 7,225,407 B2 * | 5/2007 | Sommerer et al. ............ 715/738 |
| 7,236,596 B2 * | 6/2007 | Prokoski ...................... 380/258 |
| 7,299,405 B1 | 11/2007 | Lee et al. |
| 7,313,762 B2 | 12/2007 | Bozdagi et al. |
| 7,343,617 B1 * | 3/2008 | Katcher et al. ................. 725/61 |
| 7,370,269 B1 * | 5/2008 | Prabhu et al. ................. 715/230 |
| 7,478,125 B2 * | 1/2009 | Chang .......................... 709/204 |
| 7,508,419 B2 * | 3/2009 | Toyama et al. ............ 348/211.3 |
| 7,653,925 B2 | 1/2010 | Hull et al. |
| 7,669,127 B2 | 2/2010 | Hull et al. |
| 7,685,426 B2 * | 3/2010 | Ramos et al. ................. 713/176 |
| 7,689,712 B2 | 3/2010 | Lee et al. |
| 8,380,866 B2 | 2/2013 | Savitzky et al. |
| 2001/0037408 A1 | 11/2001 | Thrift et al. |
| 2001/0054019 A1 | 12/2001 | De Fabrega |
| 2002/0010641 A1 | 1/2002 | Stevens et al. |
| 2002/0048224 A1 | 4/2002 | Dygert et al. |
| 2002/0056082 A1 | 5/2002 | Hull et al. |
| 2002/0097885 A1 | 7/2002 | Birchfield et al. |
| 2002/0163548 A1 | 11/2002 | Chiu et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2003/0007776 A1 | 1/2003 | Kameyama et al. |
| 2003/0117652 A1 | 6/2003 | Lapstun |
| 2003/0220988 A1 | 11/2003 | Hymel |
| 2003/0231198 A1 * | 12/2003 | Janevski ....................... 345/704 |
| 2003/0234772 A1 | 12/2003 | Zhang et al. |
| 2004/0078805 A1 | 4/2004 | Brian et al. |
| 2004/0105004 A1 | 6/2004 | Rui et al. |
| 2004/0133635 A1 * | 7/2004 | Spriestersbach et al. ...... 709/203 |
| 2004/0143602 A1 | 7/2004 | Ruiz et al. |
| 2004/0143630 A1 | 7/2004 | Kaufmann et al. |
| 2004/0201685 A1 | 10/2004 | Seaman et al. |
| 2004/0210833 A1 * | 10/2004 | Lerner et al. .................. 715/512 |
| 2004/0236830 A1 * | 11/2004 | Nelson et al. ................. 709/204 |
| 2004/0237032 A1 * | 11/2004 | Miele et al. ................... 715/512 |
| 2004/0244039 A1 | 12/2004 | Sugahara et al. |
| 2004/0249650 A1 | 12/2004 | Freedman et al. |
| 2004/0263636 A1 | 12/2004 | Cutler et al. |
| 2005/0064935 A1 | 3/2005 | Blanco |
| 2005/0114521 A1 | 5/2005 | Lee |
| 2005/0216851 A1 * | 9/2005 | Hull et al. ..................... 715/512 |
| 2005/0275716 A1 * | 12/2005 | Shingu et al. ............... 348/14.13 |
| 2006/0005136 A1 | 1/2006 | Wallick et al. |
| 2006/0010095 A1 | 1/2006 | Wolff et al. |
| 2006/0041542 A1 | 2/2006 | Hull et al. |
| 2006/0041632 A1 | 2/2006 | Shah et al. |
| 2006/0048058 A1 | 3/2006 | O'Neal et al. |
| 2006/0129576 A1 | 6/2006 | Carpentier et al. |
| 2006/0284981 A1 | 12/2006 | Erol et al. |
| 2007/0033419 A1 | 2/2007 | Kocher et al. |
| 2007/0038935 A1 | 2/2007 | Hull et al. |
| 2007/0053004 A1 * | 3/2007 | Calaway ....................... 358/3.28 |
| 2008/0119235 A1 | 5/2008 | Nielsen et al. |

FOREIGN PATENT DOCUMENTS

| | | | |
|---|---|---|---|
| JP | 08-125737 A | 5/1996 | |
| JP | 10-246041 | 9/1998 | |
| JP | 11-298635 A | 10/1999 | |
| JP | 2000/168294 A | 6/2000 | |
| JP | 2002057981 A | 2/2002 | |
| JP | 2003/009107 A | 1/2003 | |
| JP | 2003/330354 A | 11/2003 | |
| JP | 2005352933 * | 6/2004 | ............ G06F 17/30 |
| JP | 2005065262 A | 3/2005 | |
| JP | 2007-004784 A | 1/2007 | |
| KR | 2003-0097669 A | 12/2003 | |
| KR | 10-2006-0133469 A | 12/2006 | |
| WO | 02/13522 A2 | 2/2002 | |

(56) References Cited

FOREIGN PATENT DOCUMENTS

| WO | 02/058432 A2 | 7/2002 |
|---|---|---|
| WO | WO 03107347 A1 | 12/2003 |
| WO | WO 2004/059536 A2 | 7/2004 |

OTHER PUBLICATIONS

Abowd et al., "Anchoring Discussions in Lecture: An Approach to Collaboratively Extending Classroom Digital Media," Computer Support for Collaborative Learning 1999, pp. 11-19, at URL: http://www.cc.gatech.edu/fce/eclass/pubs/csc199/final.htm.
Abowd et al., "Building a Digital Library of Captured Educational Experiences," Invited paper for the 2000 International Conference on Digital Libraries, Kyoto, Japan, Nov. 13-16, 2000, 8 pages.
Abowd et al., "Classroom 2000: A System for Capturing and Accessing Multimedia Classroom Experiences," 3 pages, printed on Mar. 11, 2005 at URL: http://www.cc.gatech.edu/fce/eclass/pubs/chi98/short/index.html.
Abowd et al., "Teaching and Learning as Multimedia Authoring: The Classroom 2000 Project," 1996, 12 pages, ACM Multimedia 1996, Boston, MA.
Brotherton et al., "Automated Capture, Integration, and Visualization of Multiple Media Streams," Proceedings of IEEE Multimedia '98, 1998, pp. 1-12, printed on Mar. 11, 2005 at URL: http://www.cc.gatech.edu/fee/eclass/pubs/ieee98, IEEE.
Brotherton, J. A., "Enriching Everyday Activities Through the Automated Capture and Access of Live Experiences—eClass: Building, Observing, and Understanding the Impact of Capture and Access in an Educational Domain," Ph.D. Thesis, Georgia institute of Technology, Jul. 2001, 287 pages, Jason Brotherton.
Chiu et al., "LiteMinutes: An Internet-Based System for Multimedia Meeting Minutes," Proc. 10th World Wide Web Conference, May 2-5, 2001, 10 pages, printed on May 5, 2004, at URL: http://citeseer.ist.psu.edu/chiu01liteminutes.html.
Chiu et al., "NoteLook: Taking Notes in Meetings with Digital Video and Ink," Proceedings of ACM Multimedia 1999 Orlando, Florida, 10 pages, Nov. 1999.
Communication from the European Patent Office regarding European Application No. 04 024 390.9-1527, dated Jan. 12, 2006, 6 pages.
Communication from the European Patent Office regarding European Application No. 04 024 390.9-1527, dated Mar. 2, 2007, 5 pages.
Cruz et al., "Capturing and Playing Multimedia Events with STREAMS," ACM Multimedia 1994, 8 pages, San Francisco, CA, 1994.
Davis et al., "A Framework for Sharing Handwritten Notes," Proceedings of UIST '98, pp. 119-120, Nov. 1998, ACM, San Francisco, Ca.
Lamming, "MDS Past Projects—NoTime—A Tool for Notetakers," Feb. 22, 1991, 3 pages, printed on Apr. 29, 2003 at URL: http://www.xrce.xerox.com/programs/mds/past-projects/notime-report.html.
Lee et al., "MinuteAid: Multimedia Note-Taking in an Intelligent Meeting Room," IEEE International Conference on Multimedia and Expo (ICME), Taipei, Taiwan, Jun. 27-30, 2004, 4 pages, IEEE.
Minneman et al., "A Confederation of Tools for Capturing and Accessing Collaborative Activity," ACM Multimedia 1995, 10 pages, San Francisco, CA.
Minneman et al., "Where Were We: Making and Using Near-synchronous, Pre-narrative Video," ACM Multimedia , 1993, 9 pages.
Moran et al., "Tivoli: Integrating Structured domain Objects into a Freeform Whiteboard Environment," Proceedings of International Conference on Human Factors in Computer Systems (CHI), Apr. 1-6, 2000, pp. 20-21.
Pedersen et al., "Tivoli: An Electronic Whiteboard for Informal Workgroup Meetings," Proceedings of International Conference on Human Factors in Computer Systems (CHI '93), Apr. 24-29, 1993, 8 pages, ACM, New York.
Pimental et al., "Linking by Interacting: a Paradigm for Authoring Hypertext," Proceedings of ACM Hypertext 2000, May 2000, 11 pages, San Antonio, TX.
Price et al., "Linking by Inking: Trailblazing in a Paper-like Hypertext," ACM Hypertest 1998, 10 pages, Pittsburg, PA.
Stifelman, L., "The Audio Notebook: Paper and Pen Interaction with Structured Speech," PhD Thesis, Sep. 1997, 150 pages, MIT 1997.
Truong et al., "Architectural Support for Building Automated Capture & Access Applications," Oct. 20, 2003, 10 pages, printed on Feb. 4, 2005, at URL: http://web.archive.org/web/20031020022039/http://www.cc.gatech.edu/classes/AY2004/cs4470_fall/readings/inca-icse03.
Truong et al., "Personalizing the Capture of Public Experiences," Proceedings of UIST 1999, Nov. 1999, 11 pages, ACM, Asheville, NC.
Weber et al., "Marquee: A Tool for Real-Time Video Logging," CHI '94, Apr. 24-28, 1994, 8 pages, Boston, MA.
Whittaker et al., "Filochat: handwritten notes provide access to recorded conversations," Human Factors in Computing Systems Proceedings of CHI '94, Apr. 24-28, 1994, pp. 271-277, ACM Press, Boston, MA.
Wilcox et al., "Dynomite: A Dynamically Organized Ink and Audio Notebook," CHI 1997 Conference Proceedings, Mar. 22-27, 1997, pp. 186-193, ACM Press, Atlanta GA.
Non-Final Office Action for U.S. Appl. No. 09/714,785, mailed Apr. 9, 2003, 27 pages.
Final Office Action for U.S. Appl. No. 09/714,785, mailed Sep. 17, 2003, 25 pages.
Advisory Action for U.S. Appl. No. 09/714,785, mailed Nov. 26, 2003, 3 pages.
Non-Final Office Action for U.S. Appl. No. 09/714,785, mailed Mar. 5, 2004, 25 pages.
Final Office Action for U.S. Appl. No. 09/714,785, mailed Dec. 7, 2004, 33 pages.
Final Office Action for U.S. Appl. No. 09/714,785, mailed Jul. 12, 2005, 8 pages.
Notice of Allowance for U.S. Appl. No. 09/714,785, mailed Nov. 1, 2005, 4 pages.
Non-Final Office Action for U.S. Appl. No. 11/250,780, mailed Jul. 27, 2007, 13 pages.
Final Office Action for U.S. Appl. No. 11/250,780, mailed May 30, 2008, 31 pages.
Non-Final Office Action for U.S. Appl. No. 09/728,560, mailed May 23, 2003.
Interview Summary for U.S. Appl. No. 09/728,560, mailed Oct. 30, 2003.
Notice of Allowance for U.S. Appl. No. 09/728,560, mailed Nov. 4, 2003.
Interview Summary for U.S. Appl. No. 09/728,560, mailed Jan. 21, 2004.
Notice of Allowance for U.S. Appl. No. 09/728,560, mailed Nov. 22, 2004.
Notice of Allowance for U.S. Appl. No. 09/728,560, mailed Dec. 16, 2005.
Non-Final Office Action for U.S. Appl. No. 11/389,513, mailed Jun. 25, 2008, 15 pages.
Final Office Action for U.S. Appl. No. 11/389,513, mailed Mar. 3, 2009, 23 pages.
Non-Final Office Action for U.S. Appl. No. 09/728,453, mailed Dec. 1, 2004, 27 pages.
Final Office Action for U.S. Appl. No. 09/728,453, mailed Sep. 21, 2005, 14 pages.
Advisory Action for U.S. Appl. No. 09/728,453, mailed Feb. 22, 2006, 4 pages.
Non-Final Office Action for U.S. Appl. No. 09/728,453, mailed Aug. 27, 2007, 12 pages.
Final Office Action for U.S. Appl. No. 09/728,453, mailed Apr. 15, 2008, 17 pages.
Non-Final Office Action for U.S. Appl. No. 09/728,453, mailed Dec. 23, 2008, 17 pages.
Non-Final Office Action for U.S. Appl. No. 09/521,252, mailed Jan. 20, 2004, 13 pages.

(56) References Cited

OTHER PUBLICATIONS

Non-Final Office Action for U.S. Appl. No. 09/521,252, mailed Oct. 21, 2004, 17 pages.
Interview Summary for U.S. Appl. No. 09/521,252, mailed Nov. 23, 2004, 3 pages.
Final Office Action for U.S. Appl. No. 09/521,252, mailed Jun. 2, 2005, 16 pages.
Advisory Action for U.S. Appl. No. 09/521,252, mailed Oct. 12, 2005, 4 pages.
Non-Final Office Action for U.S. Appl. No. 09/521,252, mailed Jan. 6, 2006, 16 pages.
Final Office Action for U.S. Appl. No. 09/521,252, mailed Oct. 5, 2006, 14 pages.
Interview Summary for U.S. Appl. No. 09/521,252, mailed Mar. 16, 2007, 3 pages.
Interview Summary for U.S. Appl. No. 09/521,252, mailed Jul. 17, 2007, 1 pages.
Notice of Allowance for U.S. Appl. No. 09/521,252, mailed Jul. 17, 2007, 10 pages.
Non-Final Office Action for U.S. Appl. No. 10/722,834, mailed Jun. 22, 2007, 14 pages.
Final Office Action for U.S. Appl. No. 10/722,834, mailed Dec. 13, 2007, 14 pages.
Interview Summary for U.S. Appl. No. 10/722,834, mailed Feb. 14, 2008, 2 pages.
Advisory Action for U.S. Appl. No. 10/722,834, mailed Mar. 4, 2008, 3 pages.
Non-Final Office Action for U.S. Appl. No. 10/722,834, mailed May 13, 2008, 16 pages.
Final Office Action for U.S. Appl. No. 10/722,834, mailed Nov. 13, 2008, 14 pages.
Advisory Action for U.S. Appl. No. 10/722,834, mailed Jan. 21, 2009, 6 pages.
Interview Summary for U.S. Appl. No. 10/722,834, mailed Mar. 30, 2009, 3 pages.
Non-Final Office Action for U.S. Appl. No. 10/722,834, mailed Jun. 9, 2009, 15 pages.
Non-Final Office Action for U.S. Appl. No. 11/158,313, mailed Nov. 14, 2008, 33 pages.
Notice of Allowance for U.S. Appl. No. 11/158,313, mailed Apr. 9, 2009, 14 pages.
U.S. Appl. No. 12/408,583, filed Mar. 20, 2009, Savitzky.
Notice of Allowance for U.S. Appl. No. 10/722,834, mailed on Nov. 30, 2009, 27 pages.
Japanese Office Action for Application No. JP2004/340904, dated Oct. 26, 2010, 3 pages.
Japanese Office Action for Application No. JP2006-159896, dated Nov. 9, 2010, 9 pages.
Interwrite Pad, Interwrite Learning Product, copyright 2007, printed on Feb. 23, 2011, at URL: http://web.archive.org/web/20071014002820/http://interwritelearning.com/products/pad/detail.html#section-3, 2 pages.
Non-Final Office Action for U.S. Appl. No. 12/408,583 mailed on Mar. 15, 2012, 14 pages.
Notice of Allowance for U.S. Appl. No. 12/408,583 mailed on Oct. 16, 2012, 5 pages (issued as U.S. Pat. No. 8,380,866).
Bilgen et al., "inSpace Projector: An Accessible Display System for Meeting Environments," 2 pages, at URL: http://www.cc.gatech.edu/pixi/pubs/ubicomp06-inspace-proj.pdf, Sep. 2006.
Elrod et al., "Liveboard: A Large Interactive Display Supporting Group Meetings, Presentations and Remote Collaboration," CHI '92, May 3-7, 1992, pp. 599-607, AMC.
"Interact, Annotate, Engage—Interwrite Pad," Brochure, 2 pages, Interwrite Learning, 2007.
"No Need for Wires! Micronet SP925 Wireless Projector Server Brings Presentation Freedom and Efficiency without Compromising Security," Partner eNews, Nov. 9, 2007, 2 pages, Micronet Communications Inc.
Schneier et al., "Cryptographic Support for Secure Logs on Untrusted Machines," Proceedings of the 7th USENIX Security Symposium, Jan. 26-29, 1998, 11 pages, USENIX, San Antonio, TX.
Smart SB685ix, Product Information, 1 page, SmartBoards.com, Dec. 2009.
Notice of Allowance for U.S. Appl. No. 11/389,513, mailed on Sep. 1, 2009, 27 pages.
Notice of Allowance for U.S. Appl. No. 09/728,453, mailed on Sep. 18, 2009, 16 pages.
Interview Summary for U.S. Appl. No. 10/722,834, mailed on Sep. 9, 2009, 3 pages.
Requirement for Restriction/Election for U.S. Appl. No. 10/887,998, mailed on Mar. 30, 2007, 10 pages.
Non-Final Office Action for U.S. Appl. No. 10/887,998, mailed on Jul. 12, 2007, 8 pages.
Final Office Action for U.S. Appl. No. 10/887,998, mailed on Jan. 8, 2008, 8 pages.
Non-Final Office Action for U.S. Appl. No. 10/887,998, mailed on Jul. 28, 2008, 8 pages.
Final Office Action for U.S. Appl. No. 10/887,998, mailed on Dec. 22, 2008, 9 pages.
Advisory Action for U.S. Appl. No. 10/887,998, mailed on Mar. 6, 2009, 3 pages.
Non-Final Office Action for U.S. Appl. No. 10/887,998, mailed on May 11, 2009, 12 pages.
U.S. Appl. No. 09/521,252, filed Mar. 8, 2000, Lee et al.
Addlesee et al., "The ORL Active Floor," IEEE Personal Communications, vol. 4, No. 5, Oct. 1997, pp. 35-41. ftp://ftp.uk.research.att.com:/pub/docs/att/tr.97.11.pdf.
Adobe Premiere Real-Time editing for HD, SD, and DV, pp. 1-2 downloaded and printed from http://www.adobe.com/products/premiere/index.html on Jan. 18, 2007.
AVerMedia DVD EZmaker USB 2.0, 1 page downloaded and printed from http://www.aver.com/2005home/product/videocapture/ezmakerusb2.0/ezmakerusb2.0.shtml on Jan. 18, 2007.
Chen et al., "Real-time Speaker Tracking Using Particle Filter Sensor Fusion," *Proc. IEEE*, 92(3):485-494 (Mar. 2004).
Communication Pursuant to Article 96(2) EPC, European Application No. 04255836.1, Jun. 11, 2007, 10 pages.
Cunado et al., "Gait Extraction and Description by Evidencing Gathering," Proceedings of the Second International Conference on Audio and Video-based Person Identification, Washington, D.C., Mar. 22-23, 1999, pp. 43-48.
Cutler et al., "Distributed Meetings: A Meeting Capture and Broadcasting System," ACM Multimedia (2002).
Denoue et al., ProjectorBox; Seamless Presentation Capture for Classrooms, *World Conference on E-Learning in Corporate, Government, Healthcare, & Higher Education (E-Learn 2005)*, Oct. 24, 2005.
Eldridge et al., "Does a Video Diary Help Recall?", Technical Report EPC-1991-124, People and Computers VII, eds. Monk et al., 1992, pp. 257-269.
Erol et al., "Multimodal Summarization of Meeting Recordings," ICME (2003).
Foote, J. et al. "An Intelligent Media Browser Using Automatic Multimodal Analysis," ACM Multimedia, 1998, pp. 375-380.
Girgensohn, A, and Boreczky, J.S. "Time-Constrained Keyframe Selection Technique," Multimedia Tools, 11(3): 347-358, Jun. 1999.
Gross et al., "Towards a Multimodal Meeting Record," ICME, pp. 1593-1596, New York, (2000).
Hilbert et al., Seamless Capture and Discovery for Corporate Memory, *The 15th International World Wide Web Conference* (WWW2006), May 23, 2006.
Hilbert et al., Seamless Presentation Capture, Indexing, and Management, *Internet Multimedia Management Systems VI* (*SPIE Optics East 2005*), Oct. 26, 2005.
Hu et al., "Audio Hot Spotting and Retrieval Using Multiple Audio Features and Multiple ASR Engines," HLT-NAACL 2004 Workshop on Interdisciplinary Approaches to Speech Indexing and Retrieval (2004).
ICSI Meeting Recorder Project: Recording software, pp. 1-3 downloaded and printed from http://www.icsi.berkeley.edu/~dpwe/research/mtgrcdr/rcd-sw.html on Jan. 18, 2007.

(56) References Cited

OTHER PUBLICATIONS

Jaimes et al., "Memory Cues for Meeting Video Retrieval," *ACM CARPE Workshop 2004*, New York, New York, pp. 74-85 (2004).

Konneker, L., "Automating Receptionists," Proceedings of the 1986 IEEE International Conference on Systems, Man, and Cybernetics, Atlanta, GA, Oct. 14-17, 1986, pp. 1592-1596.

Lamming et al., "Activity-based Information Retrieval: Technology in Support of Personal Memory," in F.H. Vogt (ed.), Personal Computers and Intelligent Systems. Proceedings of Information Processing 92, vol. III, Elsevier Science Publishers, 1992, pp. 68-81.

Lee et al., "Portable Meeting Recorder," ACM Multimedia, pp. 493-502 (2002).

Lovstrand, L., "Being Selectively Aware with the Khronika System," Proceedings of the Second European Conference on Computer-Supported Cooperative Work, Kluwer Academic Publishers, 1991, pp. 265-277.

Meet?ng Room, An Interactive Systems Labs Project, p. 1 downloaded and printed from http://www.is.cs.cmu.edu/meeting_room/browser/browser_toprint.html on Jan. 18, 2007.

Nair, R., "Calculation of an Aggregated Level of Interest Function for Recorded Events," ACM Multimedia (2004).

Newman et al., "PEPSYS: Generating Autobiographies by Automatic Tracking," Proceedings of the Second European Conference on Computer-Supported Cooperative Work, Sep. 25-27, 1991, Amsterdam, The Netherlands, pp. 175-188.

Nishimura et al., "Indexing of human motion at meeting room by analyzing time-varying images of omni-directional camera," *Conference on Computer Vision*, 1:1-4 (2000).

Nuance—ScanSoft Imaging Solutions, p. 1 downloaded and printed from http://www.nuance.com/scansoft/ on Jan. 18, 2007.

Plamondon, R.; and Lorette, G., "Automatic Signature Verification and Writer Identification—The State of the Art," Pattern Recognition, vol. 22, No. 2, 1989, pp. 107-131.

Product Description for Meeting Companion by Quindi Corporation, downloaded from http://quindi.com/product.htm on Jan. 24, 2005.

Rangan, P.V. "Software Implementation of VCRs on Personal Computing Systems," IEEE, 1992, pp. 635-640.

Rangan, P.V. et al., "A Window-Based Editor for Digital Video and Audio," IEEE 1992 pp. 640-648.

Rosenschein, S., "New Techniques for Knowledge Capture," from TTI/Vanguard Conference: Knowledge Management Comes of Age, pp. 1-3, Sep. 23-24, 2003.

Rui et al., "Automating lecture capture and broadcast: technology and videography," *ACM Multimedia Systems Journal*, 10:1-13 (2004).

Seiko Instruments, Inc., "Smart Lobby: The Electronic Sign-In Book That Tracks Visitors and Prints Badges, User Guide for Windows," Manual Part No. 22-93000-00, copyright 1997.

Song et al., "PCCAIS: A Personal Videoconference Archive Indexing System," ICME (2003).

Sony Music Corporation, "E-Guide Unmanned Reception System," Japan Industrial Journal, May 20, 1996, p. 6, (http://salmon.crc.ricoh.com:8001/hull/1999/8/11207/11207.html).

Sony EVI-D100 Pan/Tilt/Zoom Color Video Camera, pp. 1-2 downloaded and printed from http://www.picturephone.com/products/sony_evid100.htm on Jan 18, 2007.

Stifelman, L. et al., "The Audio Notebook," SIGCHI 2001, Mar. 31-Apr. 5, 2001, pp. 182-189, vol. 3, No. 1, Seattle, WA.

Systran® Language Translation Technologies, p. 1 downloaded and printed from http://www.syttransoft.com/index.html on Jan. 18, 2007.

Uchihashi et al., "Video Magna: Generating Semantically Meaningful Video Summaries," *Proc. Multimedia '99*, pp. 383-392, ACM (1999).

Viredaz, M.A., "The Itsy Pocket Computer Version 1.5: User's Manual," Technical Note TN-54, Compaq Western Research Laboratory, Jul 1998., pp. 1-37.

Want et al., "The Active Badge Location System," ACM TOIS, Transactions on Information Systems, vol. 10, No. 1, Jan. 1992, pp. 91-102.

WebEx: Web Conferencing, Online Meetings, and Video Conferencing, p. 1 downloaded and printed from http://www.webex.com on Jan. 18, 2007.

\* cited by examiner

EVENT-DRIVEN ANNOTATION TECHNIQUES

BACKGROUND OF THE INVENTION

The present invention relates to annotation techniques, and more particularly to techniques for bookmarking or annotating digital information to facilitate subsequent search and browsing of the information.

Several techniques and systems have been devised to capture digital information. For example, information may be captured during meetings, presentations, classroom lectures, demonstrations, conferences, interviews, legal proceedings, focus group meetings, surveillance activities, and the like. The captured digital information may include time-varying information such as video information and audio information, images, documents, slides, whiteboard information, notes information, and the like. Various information capture devices may be used to capture the information. The captured information is typically stored in a database for subsequent retrieval and use.

A user may want to browse or search the digital information, possibly to find sections of the information of interest to the user. However, due to the different types of information, searching and browsing the information is generally a non-trivial task. Annotations are generally added to digital information to make browsing and searching the information more efficient. For example, certain sections of the captured digital information may be marked as "important" for a meeting, or a user may want to bookmark the digital information where a specific question was asked, etc.

Some applications are available that automatically annotate digital information to facilitate search and browsing activities. However, in practice, it is seen that most of such automatic annotation techniques are erroneous and are not able to take place of human annotation. Further, the annotations are typically added (either manually or by automatic tools) subsequent to the recording session during which the digital information was captured. As a result, the annotations are not immediately available for browsing or searching or performing other operations on the information during the recording session.

In light of the above, improved annotation techniques are desired.

BRIEF SUMMARY OF THE INVENTION

Embodiments of the present invention provide techniques for annotating or bookmarking digital information. The digital information is annotated based upon events determined from the digital information. The digital information that is annotated may comprise one or more types of information including but not restricted to video information, audio information, images, documents, slides information, whiteboard information, notes information, and the like.

According to an embodiment of the present invention, techniques are provided for annotating digital information. A set of one or more events are identified from the digital information. Information identifying the set of events is output via an output device. User input is received indicating selection of at least one event from the set of events. The digital information is annotated based upon the at least one event.

According to an embodiment of the present invention, a time associated with the at least one event may be determined and used to annotate the digital information. In another embodiment, the digital information may be annotated for a duration of the at least one event.

According to an embodiment of the present invention, the digital information is captured during a recording session, and the operations of identifying the set of events, outputting information identifying the set of events, receiving the user input, and annotating the digital information are performed during the recording session.

According to another embodiment of the present invention, techniques are provided for annotating digital information, where a set of one or more events are determined from the digital information. A signal is received and a first event is determined for the signal from the set of events. The digital information is annotated based upon the first event. The signal may be caused due to an action performed by a user.

According to an embodiment of the present invention, a time associated with the signal is determined and an event determined from the set of events whose start time is prior to and closest to the time associated with the signal. A time associated with the first event may be determined and used to annotate the digital information.

According to an embodiment of the present invention, the digital information is captured during a recording session, and the operations of identifying the set of events, receiving the signal, determining the first event, and annotating the digital information are performed during the recording session.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for annotating or bookmarking digital information. The digital information is annotated based upon events determined from the digital information. For example, information captured (or recorded) during a meeting may be annotated based upon a set of events determined from the captured information. The digital information may be captured during a recording session. The recording session may occur for example at a meeting, a presentation, a classroom lecture, a demonstration, a conference, an interview, a legal proceeding, a focus group meeting or activity, a surveillance activity, and so forth where information is recorded. The digital information that is annotated may comprise one or more types of information including but not restricted to video information, audio information, images, documents, slides information, whiteboard information, notes information, and the like.

Figure 1:
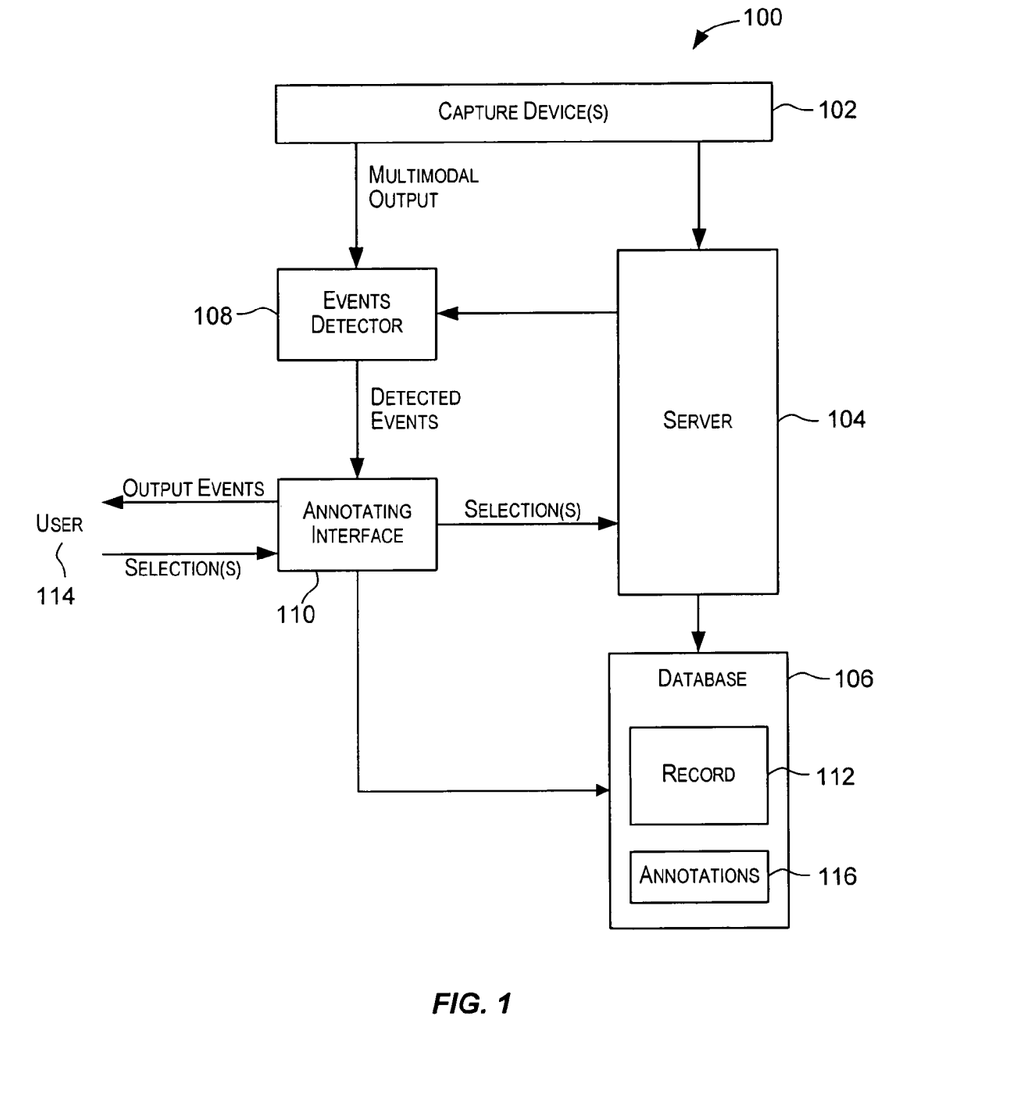
FIG. 1 depicts a simplified system that may incorporate an annotation system according to an embodiment of the present invention.

FIG. 1 depicts a simplified system 100 that may incorporate an annotation system according to an embodiment of the present invention. As depicted in FIG. 1, system 100 comprises one or more capture devices 102, a server 104, a database 106, an events detector 108, and an annotating interface 110. The various components depicted in FIG. 1 may be implemented in software, hardware, or combinations thereof. FIG. 1 is merely illustrative of an embodiment incorporating the present invention and does not limit the scope of the invention as recited in the claims. One of ordinary skill in the art would recognize other variations, modifications, and alternatives.

Capture devices 102 are configured to capture digital information. The information may be captured during a recording session. Capture devices 102 may be configured to capture or record information of different types such as audio information, video information, images, etc. Capture devices 102 may include different types of devices including, but not limited to, an audio recorder, video recorder, presentation slides recorder, whiteboard information recorder, document recorder, notes recorder, image recorder, etc. For example, for a recording session during a meeting, an audio recorder (e.g., a microphone) may be configured to capture audio information during the meeting. The captured audio information may comprise, for example, information spoken by a meeting participant. A video recorder (e.g., a video camera) may be configured to capture video information during the meeting, a slides recorder may be configured to capture slides shown during the meeting, a whiteboard information recorder (e.g., a camera configured to capture images of a whiteboard) may be configured to capture information written on a whiteboard, a document recorder may be configured to capture documents presented or distributed during the meeting, a notes recorder may be configured to capture notes taken by one or more meeting participants, and the like.

The information captured by capture devices 102 may be communicated to a server 104, as depicted in FIG. 1. Server 104 may receive the multimodal output of capture devices 102 and store the captured digital information in database 106. Database 106 may be any repository for storing digital information. The captured information may be stored in various forms. In one embodiment, as depicted in FIG. 1, the captured information may be stored as a record 112. For example, information captured during a meeting may be stored as a meeting record. Multiple records may be stored in database 106 corresponding to information captured during multiple sessions. For example, multiple meeting records may be stored comprising information captured during multiple meetings. In some embodiments, server 104 may process the captured digital information prior to storing the information in database 106. Accordingly, database 106 may store the information captured by capture devices 102 or a portion thereof.

Annotation of digital information is facilitated by events detector 108 and annotating interface 110 modules. Events detector 108 and annotating interface 110 may be used to annotate the digital information captured by capture devices 102 and stored in database 106. Events detector 108 is configured to process the digital information to be annotated and detect one or more events from the digital information. In the embodiment depicted in FIG. 1, events detector 108 may receive the digital information to be annotated from server 104 or directly from capture devices 102. Alternatively, events detector 108 may access the digital information to be annotated from database 106.

In one embodiment, server 104 is configured to stream the captured information received from capture devices 102 to events detector 108. Server 104 may stream the information to events detector 108 continuously or in a periodic manner, or upon receiving a request for the information from events detector 108. In one embodiment, server 104 may receive information captured by capture devices 102, store the information in database 106, and then communicate information to events detector 108 identifying the location where the captured information is stored in database 106. Events detector 108 may use the location information received from server 104 to access the captured information from database 106 for further processing.

Events detector 108 may detect various different events from the digital information. Events are typically detected based upon the contents of the digital information. Since the digital information may include information of various different types (e.g., audio, video, image), the event detection techniques that events detector 108 uses to detect the events may depend on the type of the information being processed. For example, various different techniques may be used to detect events from captured audio information. The events that are detected from audio information may include, but are not limited to, detecting a new source of the audio (e.g., when a new speaker speaks), detecting a change in the sound source, detecting a particular audio source (e.g., when a particular speaker speaks), detecting a period of silence (the length of the silence to be detected as an event may be user-configurable), detecting a change in the direction of the sound source, and the like. For example, according to one technique, events detector 108 may perform sound localization on 4-channel audio in real-time and save a key frame from the captured video stream in the direction of the sound. Further details related to such a technique are described in D. S. Lee, B. Erol, J. Graham, J. J. Hull, and N. Murata, "Portable meeting recorder," ACM Multimedia, pp. 493-502, 2002, the entire contents of which are herein incorporated by reference for all purposes. Events detector 108 may also detect an event in the audio information each time the sound direction is changed. Events detector 108 may also identify "audio hotspots" from the audio stream such as occurrences of applause, laughter, singing, shouting, etc. A technique for performing such analysis is described in Qian Hu et al, "Audio Hot Spotting and Retrieval Using Multiple Features" HLT-NAACL 2004 Workshop on Interdisciplinary Approaches to Speech Indexing and Retrieval, 2004, the entire contents of which are herein incorporated by reference for all purposes.

In addition to audio information, events detector 108 may also process and detect events from other types of information. Events detector 108 may analyze video information to determine one or more events based upon the contents of the video information. For example, a video stream may be analyzed for "visual hotspots" such as occurrences in the video stream of somebody leaving the room or getting up to the whiteboard to write something, someone making gestures, etc. Examples of techniques for performing such analyses are described in D. S. Lee, B. Erol, J. Graham, J. J. Hull, and N. Murata, "Portable meeting recorder," ACM Multimedia, pp.

493-502, 2002, and B. Erol, D. Lee, J. Hull, "Multimodal summarization of meeting recordings," ICME, 2003, the entire contents of which are herein incorporated by reference for all purposes.

As another example, events detector 108 may detect events related to slides (referred to as slide-related events). Slide-related events may be detected from various types of information. For example, slide-related events may be detected from a video stream captured from a computer executing a slides presentation such as a PowerPoint presentation. Slide-related events may also be determined from slides information captured directly from an application used for the slides presentation (e.g., from a MS PowerPoint application). Slide-related events may also be determined from video information captured by a camera that may be pointed to a screen on which the slides are shown and configured to capture a video of the slides presentation. Events detector 108 may also detect slide-related events from analyzing other types of captured information. Slide-related events may comprise, but are not restricted to, determining a slide change event (e.g., when a new slide is shown), consecutive slide changes in a short time, elapsing of a user-configurable time period without a change in slide, no slide-related event for a period of time, etc. In one embodiment, slide-related events may be detected by extracting keyframes from captured video information.

Further examples of different events and techniques that may be used by events detector 108 are described in D. S. Lee, B. Erol, J. Graham, J. J. Hull, and N. Murata, "Portable meeting recorder," ACM Multimedia, pp. 493-502, 2002, T. Nishimura, H. Yabe, and R. Oka, "Indexing of human motion at meeting room by analyzing time-varying images of omni-directional camera," Conference on Computer Vision, vol. 1, pp. 1-4, 2000, B. Erol, D. Lee, J. Hull, "Multimodal summarization of meeting recordings," ICME, 2003, and R. Cutler, Y. Rui, A. Gupta, J. J. Cadiz, and I. Tashev, "Distributed meetings: A meeting capture and broadcasting system," ACM Multimedia, 2002, the entire contents of which are herein incorporated by reference for all purposes.

In addition to detecting events from the digital information, events detector 108 may also be configured to generate or determine a visual representation for each detected event. The visual representation may be determined from the digital information. The visual representation may be used to display the detected event. Various different techniques may be used to generate a visual representation for an event. For example, the visual representation for an event may be in the form of a text string describing the event, a keyframe or image selected from the digital information (e.g., selected from the video information stream) when the event occurred, or any other representation that is representative of the event. Various types of visual representations may be used.

A user may customize the functioning of events detector 108 to suit the user's needs. For example, a user may configure events detector 108 to detect only those events that are of interest to the user. These events of interest to the user may be a subset of the events that events detector 108 is capable of detecting. A user may also configure events detector 108 to detect user-specified types of events.

Events detector 108 is configured to communicate information related to the detected events to annotating interface 110 for further processing. The information communicated to annotating interface 110 may comprise information identifying the detected events and visual representations associated with the events. Annotating interface 110 is configured to display the detected events to a user 114. The events may be displayed by displaying the visual representations associated with the detected events. The events may be displayed in chronological order based upon the time of occurrence of the events in the digital information. For example, in one embodiment, the events may be displayed along a timeline. Additional information may also be displayed for each event such as the time in the recorded information when the event occurs, the type of recorded information from which the event was detected, the technique used for detecting the event, and the like. An example of a graphical user interface (GUI) that may be used to display detected events is depicted in FIG. 5 and described below.

Annotating interface 110 enables a user to annotate the digital information based upon events determined from the digital information. Annotating interface 110 is configured to display to the user one or more events detected by events detector 108 from the digital information that is to be annotated. A user may then add annotations by selecting one or more of the displayed events. The selected events represent events for which annotations are to be added to the digital information. Portions of the digital information that are to be annotated are determined from the user-selected events.

Various different ways may be provided for selecting events. In one embodiment, annotating interface 110 is a graphical user interface that displays the detected events and provides options for the user to select one or more of the displayed events. The user may use an input device such as a mouse to select one or more events from the displayed events for which the user wishes to add annotations to the digital information.

The annotations may be added to the digital information by annotating interface 110 or by some other component. For example, in the embodiment depicted in FIG. 1, annotations may be added by annotating interface 110 or by server 104. For example, if server 104 is configured to perform the annotations, after one or more events have been selected by the user, annotating interface 110 may communicate information identifying the selected events to server 104. Other information related to the user-selected events such as information related to the user that made the selections, etc., may also be communicated to server 104. Server 104 may then be configured to annotate the captured digital information (e.g., the digital information stored in database 106) based upon the user-selected events.

The digital information may be annotated in different ways. In one embodiment, for a user-selected event, a time when the event occurs in the digital information is determined and that time is used to determine where to annotate the digital information. For example, an annotation may be added to the digital information at the time when the event occurs in the digital information. Alternatively, the digital information may be annotated at the start of the selected event (i.e., at the start time of the selected event), at the end of the event (i.e., at the end time of the selected event), middle of the event, or any point during the selected event, etc. Various other methods (e.g., time of event plus 2 minutes, time of event minus 5 minutes, etc.) based upon the time associated with the event may be used to determine where the annotation is to be added. Alternatively, the digital information may be annotated for the entire duration of the selected event (e.g., from the start time of the event to the end time of the event). The manner in which the digital information is to be annotated may be specified or configured by the user of the system. In one embodiment, in the default mode, the digital information is annotated at the start time of each selected event.

Annotations 116 may be stored as part of digital information in database 106. For example, if information for a particular record 112 is annotated, then the annotation information may be stored are as part of the record. The annotation information may also be stored separately and correlated to the digital information which may be stored in a record 112 in database 106.

The contents of each annotation may also vary. In one embodiment, an annotation may comprise only a timestamp. The timestamp may correspond to the time when an event, for which the annotation is being added, occurs in the digital information. In other embodiments, other information may also be stored as part of an annotation such as time and date when the annotation was applied, information related to the user who selected the event that caused the annotation (e.g., the user who caused the annotation to be applied), location of the user when the annotation was applied (e.g., a user may be in his/her office when the annotation was applied to the recorded information of a meeting that occurred three weeks ago in another building), mood of the user (e.g., the heart rate of the user obtained from a heart monitor worn by the user), environmental conditions when the user selected the event that resulted in the annotation (e.g., surrounding temperature), the type of event, and the like.

In the manner described above, events detector 108 and annotating interface 110 facilitate the annotation process. Events detector 108 is configured to detect events from the digital information to be annotated. Annotating interface 110 is configured to display the detected events to a user, receive information from the user identifying user-selected events, and annotate (or cause the annotation) the digital information based upon the user-selected events. In this manner, embodiments of the present invention provide a simple, convenient, and efficient technique for performing events-driven annotations.

Annotating interface 110 may also be used to select the digital information to be annotated. A list of available records storing digital information may be displayed to the user and the user may be allowed to select a record for which annotations are to be added. For example, database 106 may store several records 112, each record storing information captured during a recording session. For example, multiple meeting records may be stored for information captured during multiple meetings. The user may then select a meeting record to be annotated. Information from the selected record may be played back to the user and also streamed to events detector 108 for events detection. Events detected by events detector 108 may be displayed by annotating interface 110. A user may then select one or more of the displayed events. The information in the selected record may then be annotated based upon the user-selected events. The annotations may subsequently be used to search, browse, or perform other operations on the annotated information.

As previously described, the information that is annotated may be captured during a recording session. For example, a recording session at a meeting may be used to capture information during the meeting. The recording session may last the length of the meeting or for a shorter time (e.g., only the first half of the meeting may be recorded). The annotation-related processing including the operations of detecting events, displaying the detected events, receiving user-selections of events, and the subsequent annotation of the information may be performed during the recording session and/or at some time after the recording session. The annotations are then available to be used for functions such as searching and browsing the digital information. In an embodiment where the annotation operations are performed during recording session, the annotated information can be searched and/or browse during the recording session. For example, information may be captured during a meeting (i.e., a recording session during a meeting). As information is captured during the meeting, the captured information may undergo events detection. Displaying of the detected events, receiving of user selection of events, and annotating the information may be performed while the recording session is continuing during the meeting. The annotation may then be used for searching and browsing during the recording session and during the meeting.

Events detector 108 and annotating interface 110 may be implemented in software (e.g., code or instructions executed by a processor), in hardware, or combinations thereof. Communication between the various components depicted in FIG. 1 may be implemented using various communication protocols and methods such as various messaging protocols, socket calls, and the like. Various different types of communication links may be used to facilitate the communications including hardwire links, optical links, satellite or other wireless communications links, wave propagation links, or any other mechanisms for communication of information.

Figure 2:
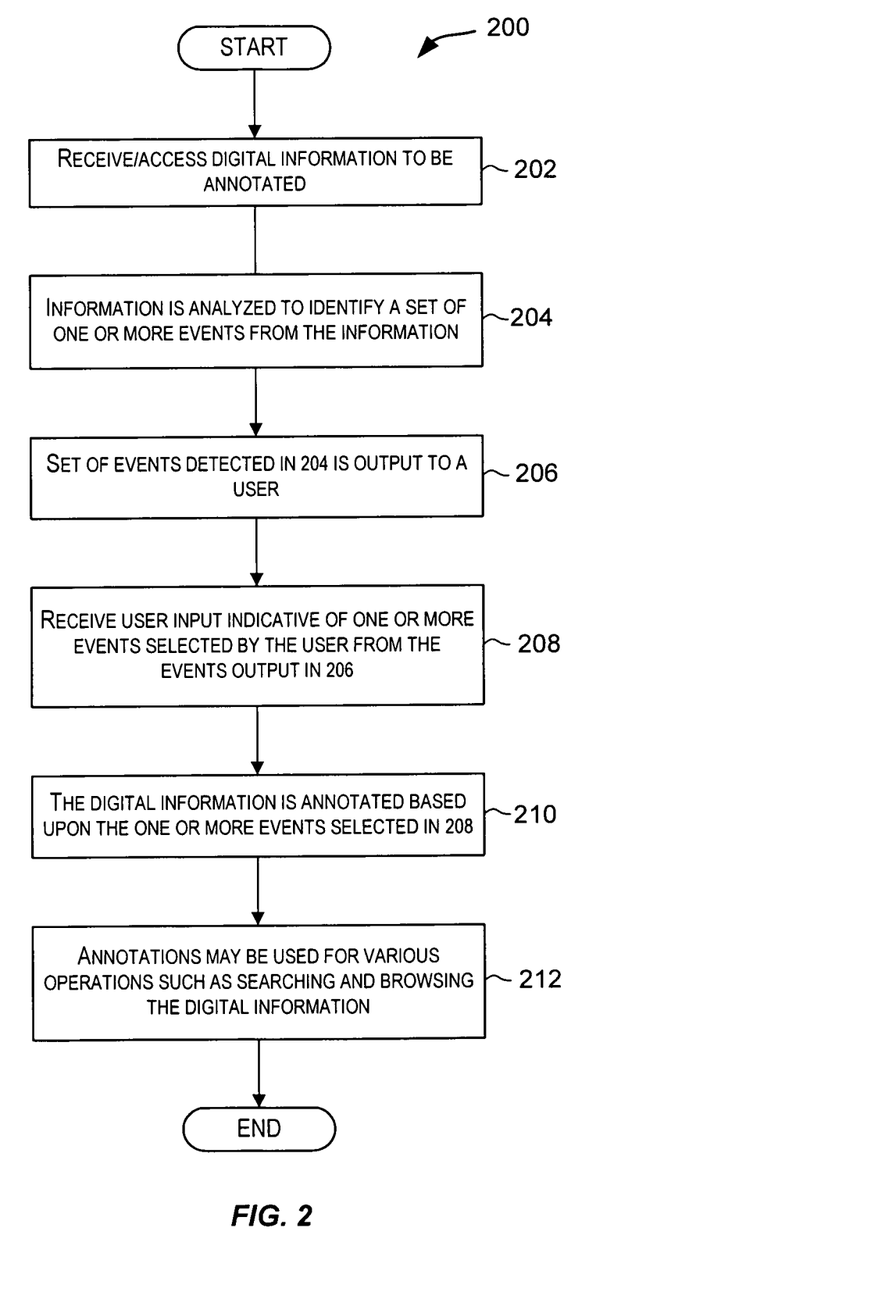
FIG. 2 depicts a simplified high-level flowchart for annotating digital information according to an embodiment of the present invention.

FIG. 2 depicts a simplified high-level flowchart 200 for annotating information according to an embodiment of the present invention. The processing depicted in FIG. 2 may be performed by software (code modules or instructions) executed by a processor, hardware modules, or combinations thereof. Flowchart 200 depicted in FIG. 2 is merely illustrative of an embodiment of the present invention and is not intended to limit the scope of the present invention. Other variations, modifications, and alternatives are also within the scope of the present invention. The method depicted in FIG. 2 may be adapted to work with different implementation constraints.

As depicted in FIG. 2, the processing is initiated upon accessing or receiving the digital information to be annotated (step 202). For example, the information captured during a meeting using one or more capture devices may be received in 202. The user may also select information to be annotated and that information may be accessed in 202. The digital information to be annotated information may comprise information of one or more types.

The digital information accessed or received in 202 is processed to identify a set of one or more events from the digital information (step 204). As described above, various events may be detected and various techniques may be used to detect the events. In one embodiment, a user may configure which events are to be detected.

The set of events detected in 204 is then output to the user (step 206). In one embodiment, a graphical user interface may be provided that displays the detected events. A user then may select one or more events from the displayed events for which annotations are to be added. Information is received indicative of one or more events selected by the user from the events output in 206 (step 208).

The digital information is then annotated based upon the one or more events selected by the user in 208 (step 210). As previously stated, for a selected event, the digital information may be annotated based upon a time associated with selected event, such as the time when the event occurs in the digital information, the starting point of the event, the end of the event, middle of the event, or some other time based upon the event, etc. The information may also be annotated for the entire duration of the selected event.

The annotations may be used for various operations on the information such as searching and browsing the information (step 212).

The processing depicted in FIG. 2 may be performed in an iterative manner. As new information is captured by the capture devices, the new information may be processed to detect events, and the captured information may be annotated based upon user-selected events.

In the manner described above, a user is able to annotate digital information by selecting events for which annotations are to be added. The events-based annotation technique provides great flexibility to the user to add annotations to the digital information in a simple and easy manner. The processing may be performed in real time during the recording session or at some time subsequent to the recording session during which the digital information that is annotated is captured.

In the embodiment described above, annotating interface 110 provides an interface via which a user selects events for which annotations are to be added to the digital information. As described above, annotating interface 110 outputs the detected events to a user and also enables a user to select one or more of the displayed events. Annotating interface 110 may take various other forms in alternative embodiments. One such alternative embodiment is depicted in FIG. 3.

Figure 3:
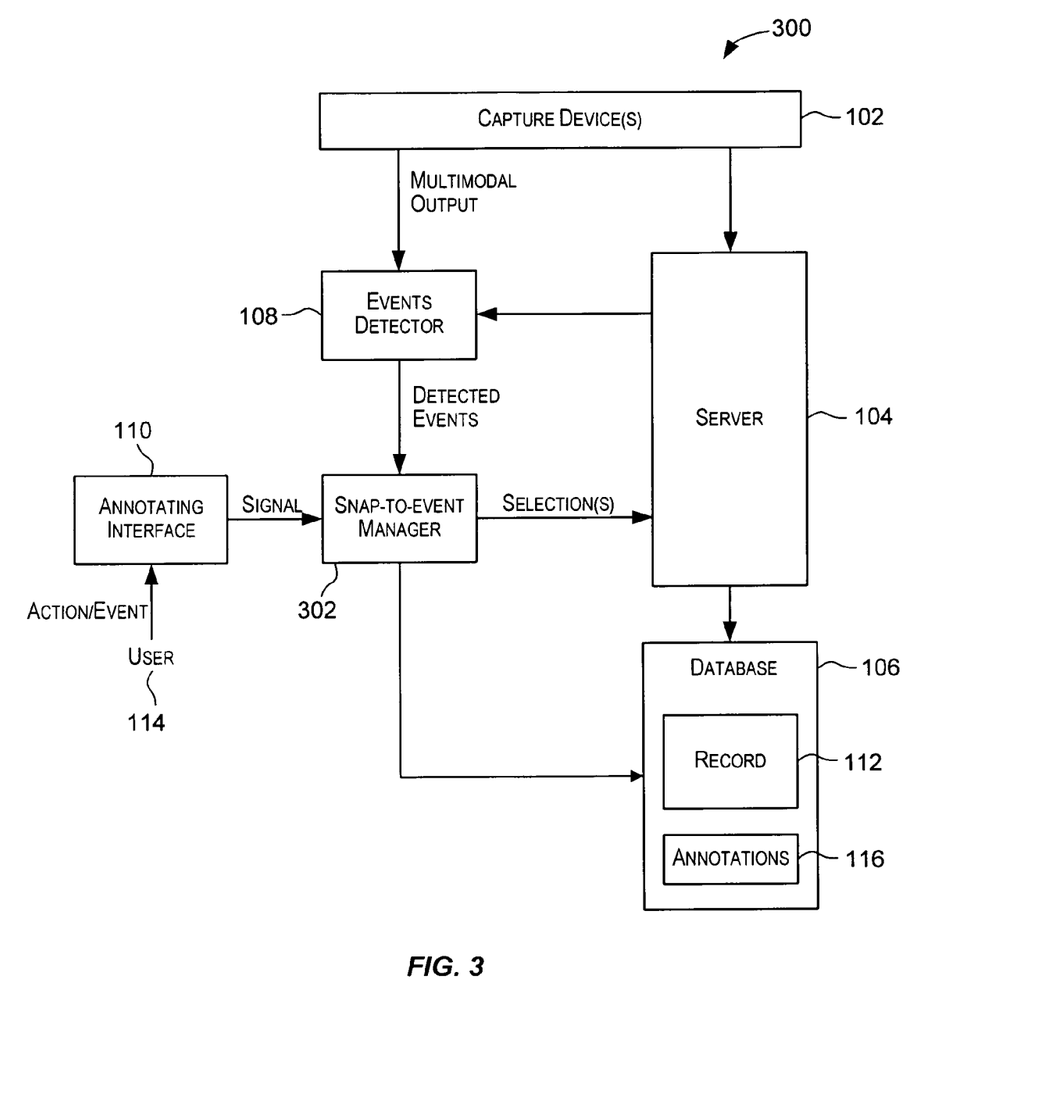
FIG. 3 depicts another simplified system that may incorporate an annotation system according to an embodiment of the present invention.

FIG. 3 depicts another simplified system 300 that may incorporate an annotation system according to an embodiment of the present invention. As depicted in FIG. 3, system 300 comprises one or more capture devices 102, a server 104, a database 106, an events detector 108, an annotating interface 110, and a snap-to-event manager 302. FIG. 3 is merely illustrative of an embodiment incorporating the present invention and does not limit the scope of the invention as recited in the claims. One of ordinary skill in the art would recognize other variations, modifications, and alternatives.

Capture devices 102, server 104, events detector 108, and database 106 are the same as those depicted in FIG. 1. Annotating interface 110 may take various different forms. Annotating interface 110 provides an interface for the user to indicate when the digital information is to be annotated. In one embodiment, annotating interface 110 may be a device that a user may use to indicate when an annotation is to be added to the digital information. For example, annotating interface 110 may be a one-button input device. During a meeting, while information is being recorded for the meeting (i.e., during a recording session for the meeting), a user may click the button of the device whenever the captured information is to be annotated. When the user clicks the button, a signal is communicated from the device to snap-to-event manager 302. In one embodiment, the signal may comprise information identifying the time when the user clicked the button. In certain embodiments, instead of the present time, upon selecting the button, a signal identifying the present time plus or minus a user configurable delta (e.g., present time minus 30 seconds, present time minus 2 minutes, present time plus 1 minute, etc.) may be communicated to snap-to-event manager 302. The signal may be communicated to snap-to-event manager 302 using wired or wireless communications (e.g., if the device is a RF device). As described below, the information captured during the meeting is annotated responsive to the signal.

Annotating interface 110 may also take other forms. In general, annotating interface 110 may be any interface that enables a signal to be sent to snap-to-event manager 302 indicating when an annotation is to be added to the digital information. Various different user actions or other triggers may trigger the signal. Examples of user actions that may trigger the signal include clapping hands, uttering specific words or phrases, making certain gestures, using a device, etc. In some embodiments, the signal sent to snap-to-event manager 302 may comprises information such as the time when the signal was triggered, information related to the user that caused the signal to be triggered, and other like information.

Snap-to-event manager 302 receives an input signal from annotating interface 110 and information identifying events detected by events detector 108. According to an embodiment of the present invention, snap-to-event manager 302 is configured to determine an event from events detected by events detector 108 whose start time is closest in time (as compared to start times of other events detected from the digital information) and occurs prior to the time associated with the signal received from annotating interface 110 (i.e., the last detected event prior to the time associated with the signal). The time associated with the signal may be determined from information included in the signal. In other embodiments, snap-to-event manager 302 may be configured to determine the time associated with the signal (e.g., the time when snap-to-event manager 302 received the signal) and determine a closest event based upon that time. Snap-to-event manager 302 thus translates the signal received from annotating interface 110 to an event detected by events detector 108 that occurs closest in time and prior to the signal.

In an embodiment where server 104 is configured to add the annotations, snap-to-event manager 302 communicates information related to the event determined for the signal to server 104. The information communicated to server 104 may include information identifying the time of occurrence of the event determined for the signal. The information communicated to server 104 may also include other information such as information identifying the event determined by snap-to-event manager 302 for the signal, information related to the user whose action caused the signal to be sent to snap-to-event manager 302, and other information.

In certain embodiments, the user can indicate the types of events that are of interest to the user and that the user would like to annotate. In these embodiments, snap-to-event manager 302 is configured to select an event from the events detected by events detector 108 that is of the user-specified type and occurs prior to and closest to the time associated with the signal received from annotating interface 110. For example, the user may be interested only in events indicating when a new slide is shown. In this example, snap-to-event manager 302 is configured to determine an event indicative of a new slide being shown that occurs closest in time to and prior to the time associated with the signal received from annotating interface 110. In this scenario, the event determined for the signal may not be the closest prior event to the signal time as there may be another event of a different type that occurred after the selected event but prior to the signal time. Snap-to-event manager 302 communicates information related to the event determined for the signal to server 104.

Based upon the event information received from snap-to-event manager 302, server 104 annotates the digital information based upon the event determined for the signal. As described above, the information may be annotated in different ways. For example, the recorded information may be annotated at the start of the selected event (i.e., at the start time of the selected event), at the end of the event (i.e., at the end time of the selected event), middle of the event, some other time based upon the event, etc. Alternatively, the digital information may be annotated for the entire duration of the selected event. The manner in which the digital information is annotated may be specified or configured by the user of the system. In one embodiment, in the default mode, the digital information is annotated at the start time of the selected event.

The annotation may be stored as part of the digital information, for example as part of record 112 or may be stored separately and correlated to the digital information. As described above, the annotation may store various different types of information such as time information, and other information. In the embodiment described above, server 104 is responsible for annotating the digital information. In alternative embodiments, the annotations may also be added by other components. For example, snap-to-event manager 302 may be configured to annotate the digital information in alternative embodiments.

The annotation-related operations including functions performed by snap-to-event manager 302 may be performed during a recording session when the information is being captured or some time after the recording session. When performed during the recording session, the annotated information may be available for browsing and searching (or other operations) during the recording session. For example, a user may be able to browse and search information captured during the meeting while the meeting is proceeding.

Annotating interface 110 and snap-to-event manager 302 may be implemented in software (e.g., code or instructions executed by a processor), in hardware, or combinations thereof. Communication between the various components depicted in FIG. 3 may be implemented using various communication protocols and methods such as various messaging protocols, socket calls, and the like. Various different types of communication links may be used to facilitate the communications including hardwire links, optical links, satellite or other wireless communications links, wave propagation links, or any other mechanisms for communication of information.

Figure 4:
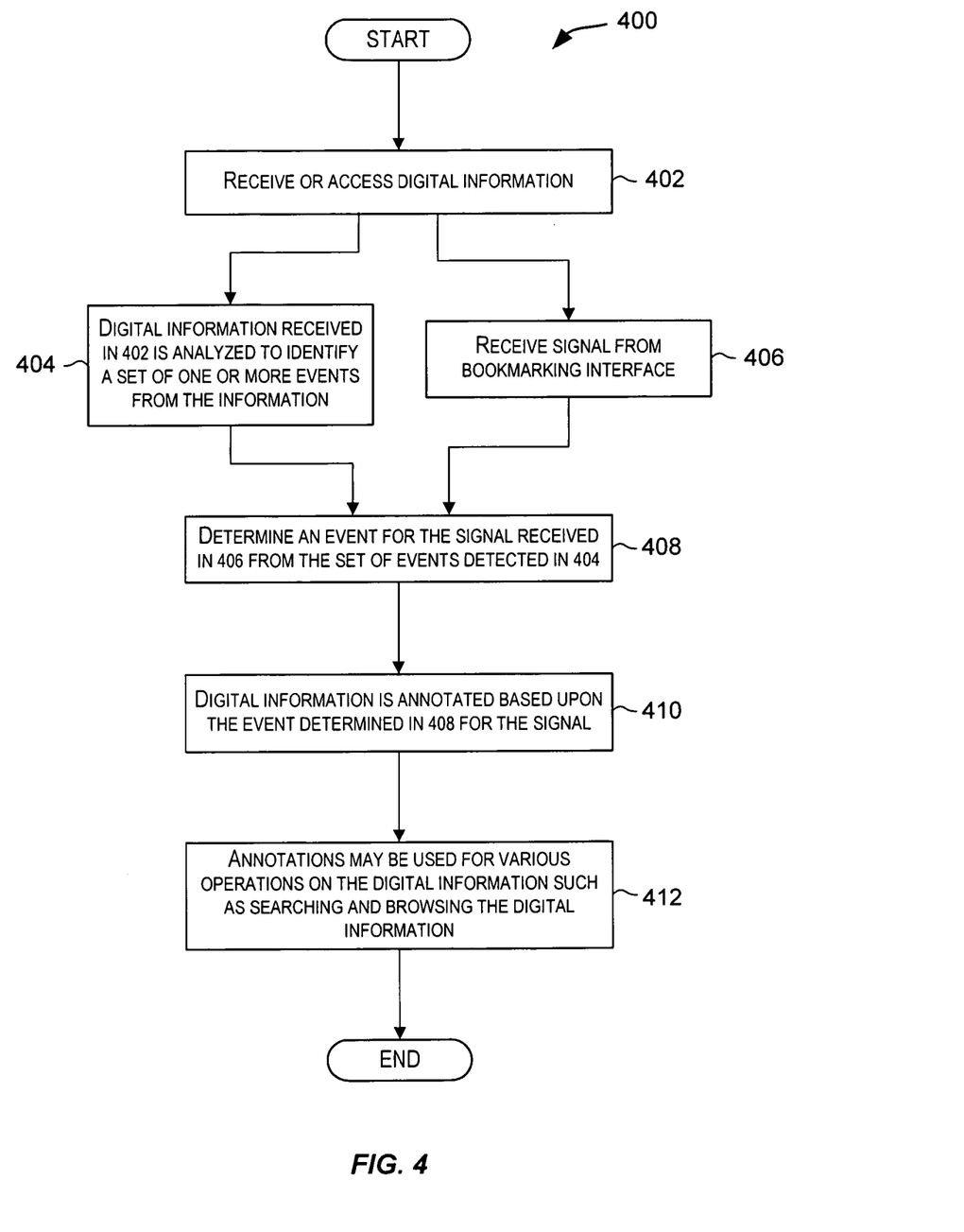
FIG. 4 depicts a simplified high-level flowchart for annotating digital information according to an embodiment of the present invention.

FIG. 4 depicts a simplified high-level flowchart 400 for annotating information according to an embodiment of the present invention. The processing depicted in FIG. 4 may be performed by software (code modules or instructions) executed by a processor, hardware modules, or combinations thereof. Flowchart 400 depicted in FIG. 4 is merely illustrative of an embodiment of the present invention and is not intended to limit the scope of the present invention. Other variations, modifications, and alternatives are also within the scope of the present invention. The method depicted in FIG. 4 may be adapted to work with different implementation constraints.

As depicted in FIG. 4, processing is initiated upon receiving or accessing the information to be annotated (step 402). The information may be received during a recording session, for example, information may be captured and received during a recording session during a meeting. One or more capture devices may be used to capture the information. The digital information received in 402 may comprise information of one or more types.

The digital information received in 402 is analyzed to identify a set of one or more events from the information (step 404). As described above, various events may be detected and various techniques may be used to detect the events. In one embodiment, a user may configure the events to be detected.

A signal may be received from the annotating interface (step 406). As previously described, the signal may be received due to some user action indicating that the user wishes to annotate the recorded information when the action is performed. For example, a user may click a button to indicate that the captured information is to be annotated. In one embodiment, the signal may be received during a recording session while information is being captured. The signal may also be received during playback of previously recorded information that is to be annotated.

An event is then determined from the set of events detected in 404 for the signal received in 406 (step 408). In one embodiment, as part of 408, a time associated with the signal is determined and an event selected from the set of events detected in 404 based upon the time. In one embodiment, the selected event is one whose start time is closest to (as compared to start times of other events detected in the recorded information) the time associated with the signal and occurs prior to the time associated with the signal.

The digital information is then annotated based upon the event determined in 408 selected (step 410). As part of 410, a time associated with the event determined in 408 may be determined and used to annotate the information. For example, an annotation may be added to the digital information at the time when the event occurs in the digital information, at the start of the selected event, at the end of the event, middle of the event, or any point during the selected event, etc. Various other methods (e.g., time of event plus 2 minutes, time or event minus 5 minutes, etc.) based upon the time associated with the event may be used to determine where the annotation is to be added. Alternatively, the digital information may be annotated for the entire duration of the selected event.

The annotations may then be used for performing various operations on the digital information such as searching and browsing the information (step 412).

The steps depicted in FIG. 4 may be performed during the meeting. The processing depicted in FIG. 4 may be performed in an iterative manner. As new information is captured by the capture devices, the new information may be processed to detect events, and the recorded information may be annotated based upon user-selected events.

In the manner described above, various different interfaces may be provided that enable a user to annotate information that may be captured during a recording session. Signals or selections received from the user are translated to events detected in the captured digital information and the digital information is annotated based upon the detected events. The events-based annotation technique provides great flexibility to the user to add annotations to the digital information in a simple and easy manner. The processing may be performed in real time during the meeting.

Figure 5A:
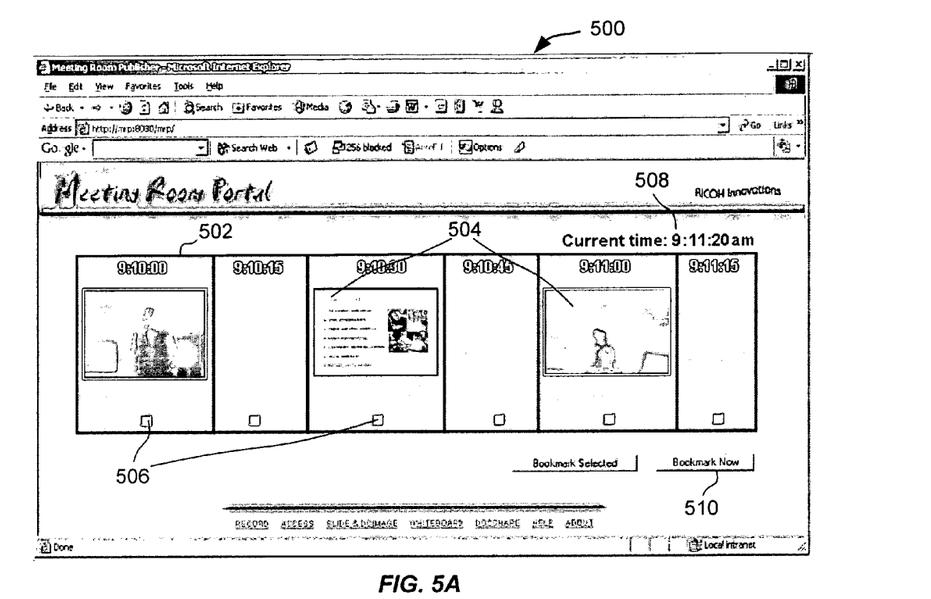
FIGS. 5A and 5B depict a simplified user interface that displays events to a user and enables a user to select one or more of the displayed events according to an embodiment of the present invention.
Figure 5B:
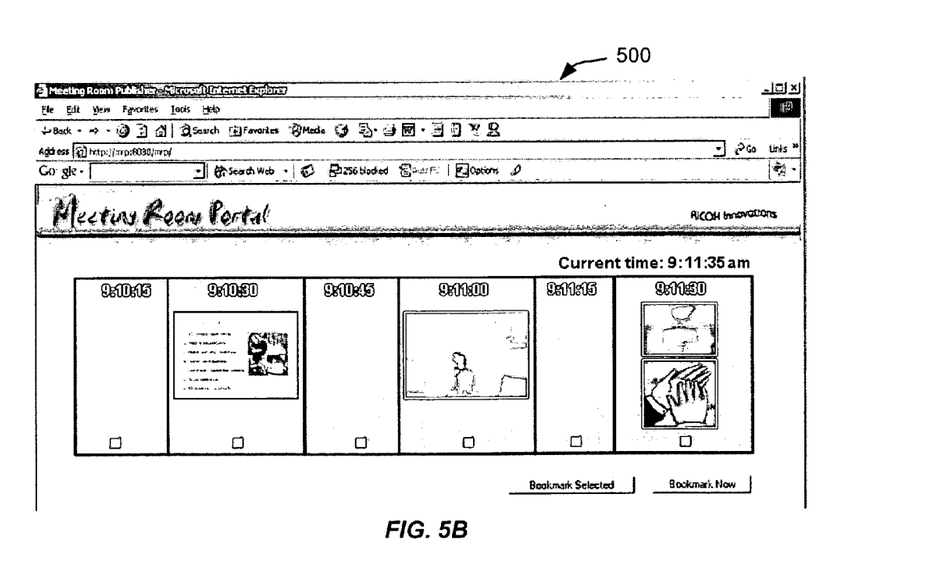

FIGS. 5A and 5B depict a simplified user interface 500 for displaying events detected in the digital information to the user and for enabling a user to select one or more of the detected events according to an embodiment of the present invention. As depicted in FIG. 5A, graphical user interface 500 displays a timeline 502 that is divided into segments. The segments on FIGS. 5A and 5B are of 15 seconds duration. A visual representation 504 is displayed for each detected event. The visual representation for an event is displayed in the segment of the timeline when the event occurs. A user-selectable box 506 is displayed for each segment. A user can select an event displayed in a segment by selecting box 506 of that segment. The current time 508 is also displayed. A user causes annotations to be added for the selected events by selecting "Bookmark Now" button 508. Timeline 502 scrolls in a horizontal direction from right to left with the passage of time. This is evident from FIG. 5B wherein timeline 502 has moved by one time segment and the new current time is displayed. In this manner, as new information is received and processed, for example during a recording session, the events detected in the information are displayed.

Figure 6:
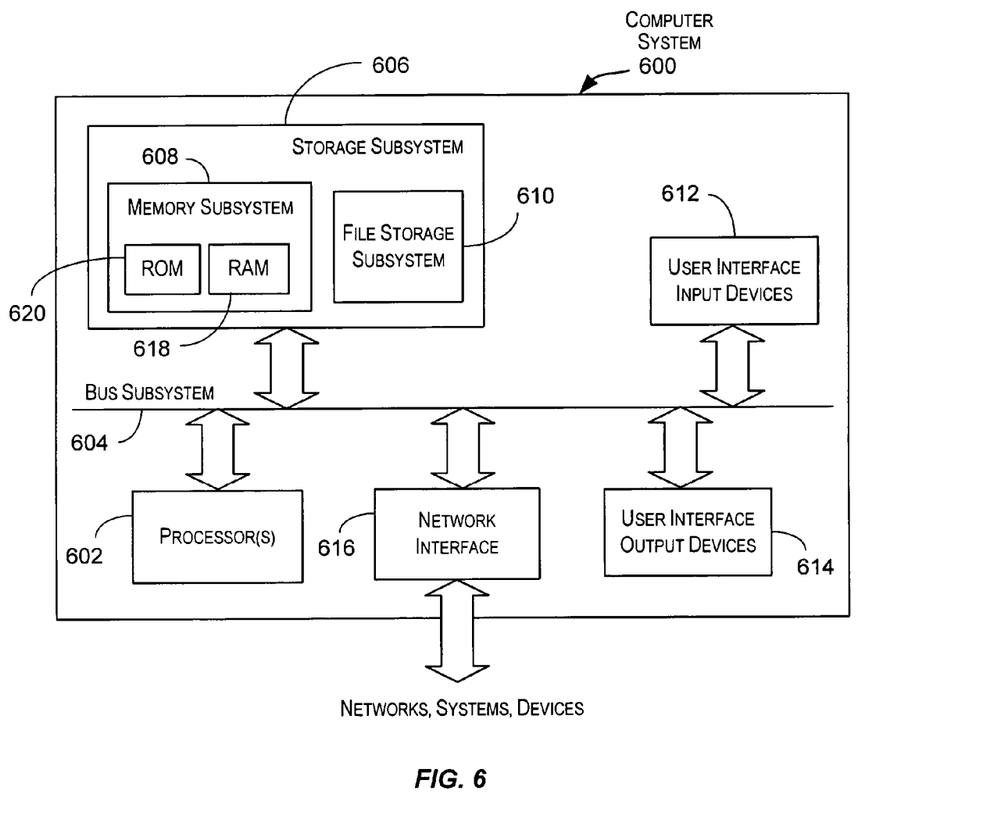
FIG. 6 is a simplified block diagram of a computer system that may be used to practice an embodiment of the present invention.

FIG. 6 is a simplified block diagram of a computer system 600 that may be used to practice an embodiment of the present invention. As shown in FIG. 6, computer system 600 includes a processor 602 that communicates with a number of peripheral devices via a bus subsystem 604. These peripheral devices may include a storage subsystem 606, comprising a memory subsystem 608 and a file storage subsystem 610, user interface input devices 612, user interface output devices 614, and a network interface subsystem 616.

Bus subsystem 604 provides a mechanism for letting the various components and subsystems of computer system 600 communicate with each other as intended. Although bus subsystem 604 is shown schematically as a single bus, alternative embodiments of the bus subsystem may utilize multiple busses.

Network interface subsystem 616 provides an interface to other computer systems, networks, and devices. Network interface subsystem 616 serves as an interface for receiving data from and transmitting data to other systems from computer system 600.

User interface input devices 612 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 600. A user may use an input device to select one or more events from the events displayed to the user in the system depicted in FIG. 1. A user may also use an input device to cause generation of the signal in the system depicted in FIG. 3.

User interface output devices 614 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 600. The detected events may be displayed to the user using an output device in the system depicted in FIG. 1.

Storage subsystem 606 may be configured to store the basic programming and data constructs that provide the functionality of the present invention. Software (code modules or instructions) that provides the functionality of the present invention may be stored in storage subsystem 606. These software modules or instructions may be executed by processor(s) 602. Storage subsystem 606 may also provide a repository for storing data used in accordance with the present invention. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 600 can be of various types including a personal computer, a portable computer, a workstation, a network computer, a mainframe, a kiosk, or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method performed by a computer system of annotating digital information captured during a recording session, the method comprising:
   identifying, by the computer system, a set of one or more events from the digital information, the identifying based upon analysis of the digital information performed by the computer system;
   determining, by the computer system, a representation for each event in the set of one or more events;
   outputting, by the computer system, via an output device, the representation for each event in the set of one or more events;
   receiving, by the computer system, user input indicating selection of at least one event from the set of events; and
   in response to the user input indicating selection, annotating, by the computer system, the digital information based upon the at least one event,
   wherein the identifying, determining, outputting, receiving, and annotating are performed during the recording session.

2. The method of claim 1 wherein annotating the digital information comprises:
   determining, by the computer system, a time associated with the at least one event; and
   annotating the digital information based upon the time associated with the at least one event.

3. The method of claim 1 wherein annotating the digital information comprises:
   annotating the digital information for a duration of the at least one event.

4. The method of claim 1 wherein:
   the digital information comprises audio information and video information; and
   identifying the set of one or more events comprises analyzing the audio information and the video information to identify the set of events.

5. The method of claim 1 wherein:
   the digital information comprises audio information; and
   the set of events comprises at least one from an event indicating a new audio, an event indicating a particular audio source, an event indicating a period of silence of at least a preconfigured length, or an event indicating a change in direction of an audio source.

6. The method of claim 1 wherein the set of events comprises at least one event from an event indicating a change from one slide to another slide, an event indicating elapsing of a preconfigured time period without a change in slide, or an event indicating an absence of a slide-related event for a period of time.

7. The method of claim 1 wherein the set of events includes at least one event based upon audio information, video information, or slide related information included in the digital information.

8. The method of claim 1 wherein the representation is a visual representation.

9. A method performed by a computer system of annotating digital information, the method comprising:
  capturing during a recording session, by the computer system, the digital information;
  identifying, by the computer system, a set of events from the digital information, the identifying based upon analysis of the digital information performed by the computer system;
  receiving, by the computer system, a signal;
  determining, by the computer system, a first event from the set of events from the digital information, based on the signal; and
  in response to determining the first event based on the signal, annotating, by the computer system, the digital information based upon the first event,
  wherein the identifying, receiving, determining, and annotating are performed during the recording session.

10. The method of claim 9 wherein the signal is caused due to an action performed by a user.

11. The method of claim 9 wherein determining the first event comprises:
  determining a time associated with the signal; and
  determining an event from the set of events whose start time is prior to and closest to the time associated with the signal.

12. The method of claim 9 wherein annotating the digital information comprises:
  determining a time associated with the first event; and
  annotating the digital information based upon the time associated with the first event.

13. The method of claim 9 wherein annotating the digital information comprises:
  annotating the digital information for a duration of the first event.

14. A system for annotating digital information, the system comprising:
  a set of one or more capture devices configured to capture the digital information during a recording session;
  a memory storing the digital information;
  an output device; and
  a processor coupled to the memory, the processor configured to:
    identify a set of events from the digital information, the identifying based upon analysis of the digital information performed by the system;
    determine a representation for each event from the set of events;
    cause the output device to output the representation for each event from the set of events;
    receive user input indicating selection of at least one event from the set of events; and
    in response to the user input indicating selection, annotate the digital information based upon the at least one event,
  wherein the processor is configured to identify, determine, cause the output device to output, receive, and annotate during the recording session.

15. The system of claim 14 wherein the processor is configured to:
  determine a time associated with the at least one event; and
  annotate the digital information based upon the time associated with the at least one event.

16. The system of claim 14 wherein the processor is configured to annotate the digital information for a duration of the at least one event.

17. A system for annotating digital information, the system comprising:
  a set of one or more capture devices configured to capture the digital information during a recording session;
  a memory storing the digital information; and
  a processor coupled to the memory, the processor configured to:
    identify a set of events from the digital information, the identifying based upon analysis of the digital information performed by the system;
    after identifying the set of events, receive a signal;
    determine a first event from the set of events, based on the signal; and
    in response to determining the first event based on the signal, annotate the digital information based upon the first event,
  wherein the processor is configured to identify, receive, determine, and annotate during the recording session.

18. The system of claim 17 wherein the signal is caused due to an action performed by a user.

19. The system of claim 17 wherein the digital information is captured during a recording session and wherein the signal is caused by an action performed by a user during the recording session.

20. The system of claim 17 wherein the processor is configured to:
  determine a time associated with the signal; and
  determine an event from the set of events whose start time is prior to and closest to the time associated with the signal.

21. The system of claim 17 wherein the processor is configured to:
  determine a time associated with the first event; and
  annotate the digital information based upon the time associated with the first event.

22. The system of claim 17 wherein the processor is configured to annotate the digital information for a duration of the first event.

23. A computer-readable non-transitory storage medium storing a plurality of instructions for controlling a data processor to annotate digital information captured during a recording session, the plurality of instructions comprising:
  instructions that cause the data processor to identify a set of events from the digital information, the identifying based upon analysis of the digital information performed by the data processor;
  instructions that cause the data processor to determine a representation for each event from the set of events;
  instructions that cause the data processor to output, via an output device, the representation for each event from the set of events;
  instructions that cause the data processor to receive user input indicating selection of at least one event from the set of events; and
  instructions that cause the data processor to, in response to the user input indicating selection, annotate the digital information based upon the at least one event, wherein the instructions cause the data processor to identify, determine, output, receive, and annotate during the recording session.

24. The computer-readable storage medium of claim 23 wherein the instructions that cause the data processor to annotate the digital information comprise:
instructions that cause the data processor to determine a time associated with the at least one event; and
instructions that cause the data processor to annotate the digital information based upon the time associated with the at least one event.

25. The computer-readable storage medium of claim 23 wherein the instructions that cause the data processor to annotate the digital information comprise:
instructions that cause the data processor to annotate the digital information for a duration of the at least one event.

26. The computer-readable storage medium of claim 23 wherein the representation is a visual representation.

27. A computer-readable non-transitory storage medium storing a plurality of instructions for controlling a data processor to annotate digital information, the plurality of instructions comprising:
instructions that cause the data processor to receive the digital information captured during a recording session;
instructions that cause the data processor to identify a set of events from the digital information, the identifying based upon analysis of the digital information performed by the data processor;
instructions that cause the data processor to receive a signal;
instructions that cause the data processor to determine a first event from the set of events, based on the signal; and
instructions that cause the data processor to, in response to the determination of the first event based on the signal, annotate the digital information based upon the first event,
wherein the instructions cause the data processor to identify, receive, determine, and annotate during the recording session.

28. The computer-readable storage medium of claim 27 wherein the signal is caused due to an action performed by a user.

29. The computer-readable storage medium of claim 27 wherein the instructions that cause the data processor to determine the first event from the set of events for the signal comprise:
instructions that cause the data processor to determine a time associated with the signal; and
instructions that cause the data processor to determine an event from the set of events whose start time is prior to and closest to the time associated with the signal.

30. The computer-readable storage medium of claim 27 wherein the instructions that cause the data processor to annotate the digital information comprise:
instructions that cause the data processor to determine a time associated with the first event; and
instructions that cause the data processor to annotate the digital information based upon the time associated with the first event.

31. The computer-readable storage medium of claim 27 wherein the instructions that cause the data processor to annotate the digital information comprise:
instructions that cause the data processor to annotate the digital information for a duration of the first event.

* * * * *